US012354577B1

(12) United States Patent
Keller et al.

(10) Patent No.: US 12,354,577 B1
(45) Date of Patent: Jul. 8, 2025

(54) SYSTEM AND METHOD FOR UNIVERSAL AUXILIARY FOOTSWITCH

(71) Applicants: Ryan Keller, Palmerton, PA (US); Thomas Anthony Murtaugh, Jim Thorpe, PA (US); Garrett Glen Hoskins, Bath, PA (US)

(72) Inventors: Ryan Keller, Palmerton, PA (US); Thomas Anthony Murtaugh, Jim Thorpe, PA (US); Garrett Glen Hoskins, Bath, PA (US)

( * ) Notice: Subject to any disclaimer, the term of this patent is extended or adjusted under 35 U.S.C. 154(b) by 63 days.

(21) Appl. No.: 18/439,398

(22) Filed: Feb. 12, 2024

(51) Int. Cl.
*G10H 1/34* (2006.01)

(52) U.S. Cl.
CPC ....... *G10H 1/348* (2013.01); *G10H 2220/265* (2013.01)

(58) Field of Classification Search
CPC .......................... G10H 1/348; G10H 2220/265
See application file for complete search history.

(56) References Cited

U.S. PATENT DOCUMENTS

| | | | | |
|---|---|---|---|---|
| 7,754,956 | B2 * | 7/2010 | Gain | G10H 1/18 84/610 |
| 8,138,406 | B2 | 3/2012 | Vinciguerra | |
| 8,609,973 | B2 | 12/2013 | D'Amours | |
| 8,802,961 | B2 | 8/2014 | Juszkiewicz | |
| 9,012,748 | B2 | 4/2015 | Vumbaco et al. | |
| 9,274,745 | B2 | 3/2016 | Clements et al. | |
| 10,192,536 | B1 | 1/2019 | Jin | |
| 10,515,617 | B2 | 12/2019 | Canivell Grifols et al. | |
| 10,546,568 | B2 | 1/2020 | Packouz | |
| 10,923,093 | B1 * | 2/2021 | Micek | G10H 3/182 |
| 2004/0144241 | A1 * | 7/2004 | Juskiewicz | G10H 1/0058 84/723 |
| 2004/0182230 | A1 | 9/2004 | Vlant et al. | |
| 2005/0056142 | A1 | 3/2005 | Mapleston et al. | |
| 2013/0327201 | A1 * | 12/2013 | Urry | G10H 1/348 84/626 |
| 2016/0314772 | A1 | 10/2016 | Alstad | |
| 2018/0254030 | A1 * | 9/2018 | Mayo | G10H 1/0008 |
| 2020/0202828 | A1 | 6/2020 | Scherbacovsky | |
| 2023/0032698 | A1 | 2/2023 | Aviv et al. | |

FOREIGN PATENT DOCUMENTS

| | | |
|---|---|---|
| GB | 2456307 A | 7/2009 |

OTHER PUBLICATIONS

"GFI System Triple Switch—Universal Auxiliary Switches," visionguitar.com. https://www.visionguitar.com/products/gfi-systems-triple-switch-universal-auxiliary-switches [Date accessed: Nov. 7, 2023].
"One Control Aux-Switch," reverb.com. https://reverb.com/p/one-control-aux-switch?ended_listing=67697791 [Date accessed: Nov. 7, 2023].

* cited by examiner

*Primary Examiner* — Jianchun Qin
(74) *Attorney, Agent, or Firm* — Bold IP, PLLC; Christopher Mayle

(57) ABSTRACT

A system and method for a universal aux footswitch for controlling digital guitar pedals. The footswitch has multiple internal control circuits which are selectable. The footswitch is compatible with diode based switching, Strymon, Meris, and Boss style digital guitar pedals. The footswitch has a mounting bracket with breakaway panels so that its size may be tailored to various size pedals.

11 Claims, 11 Drawing Sheets

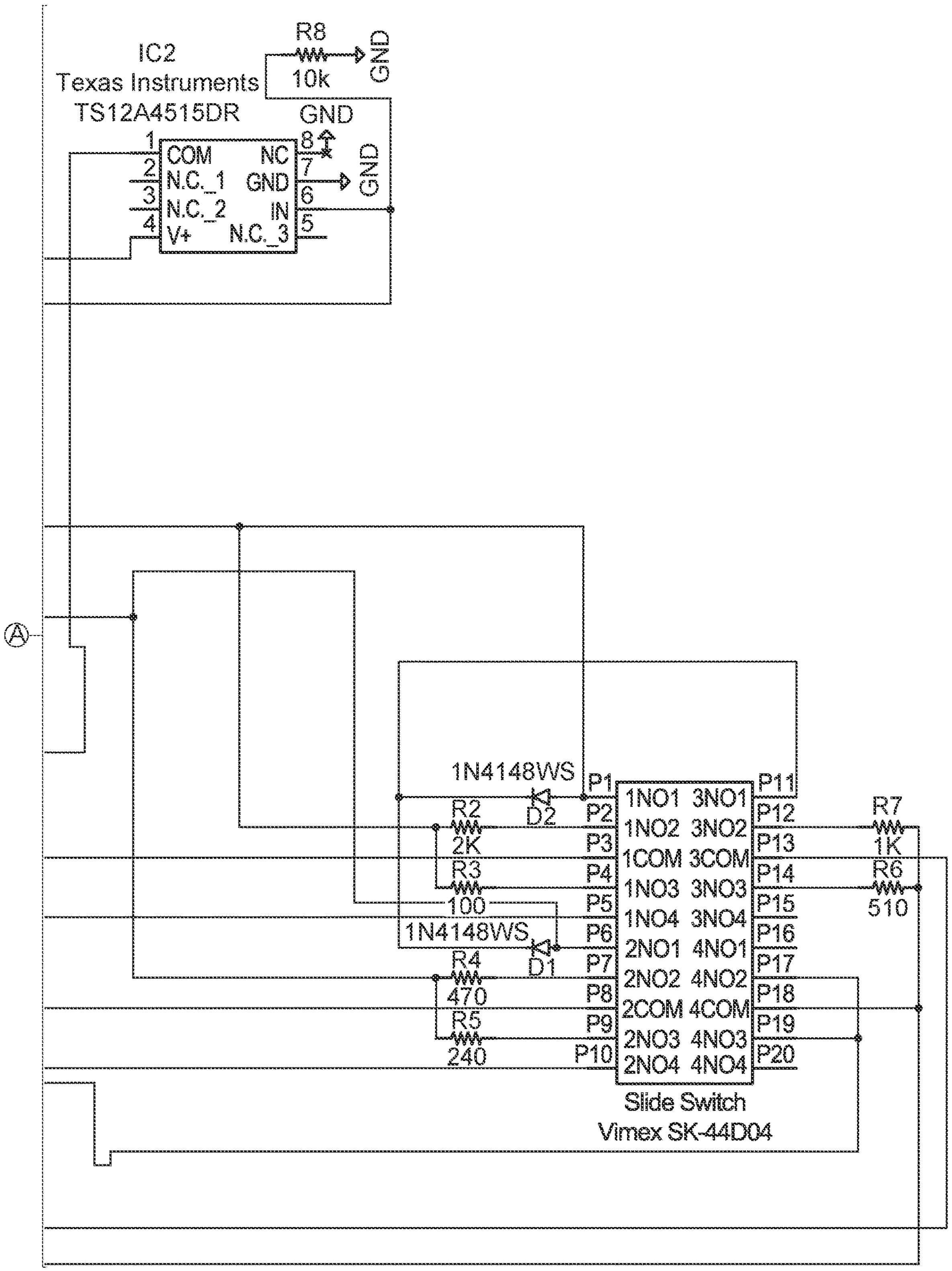
FIG. 3 (Continued...)

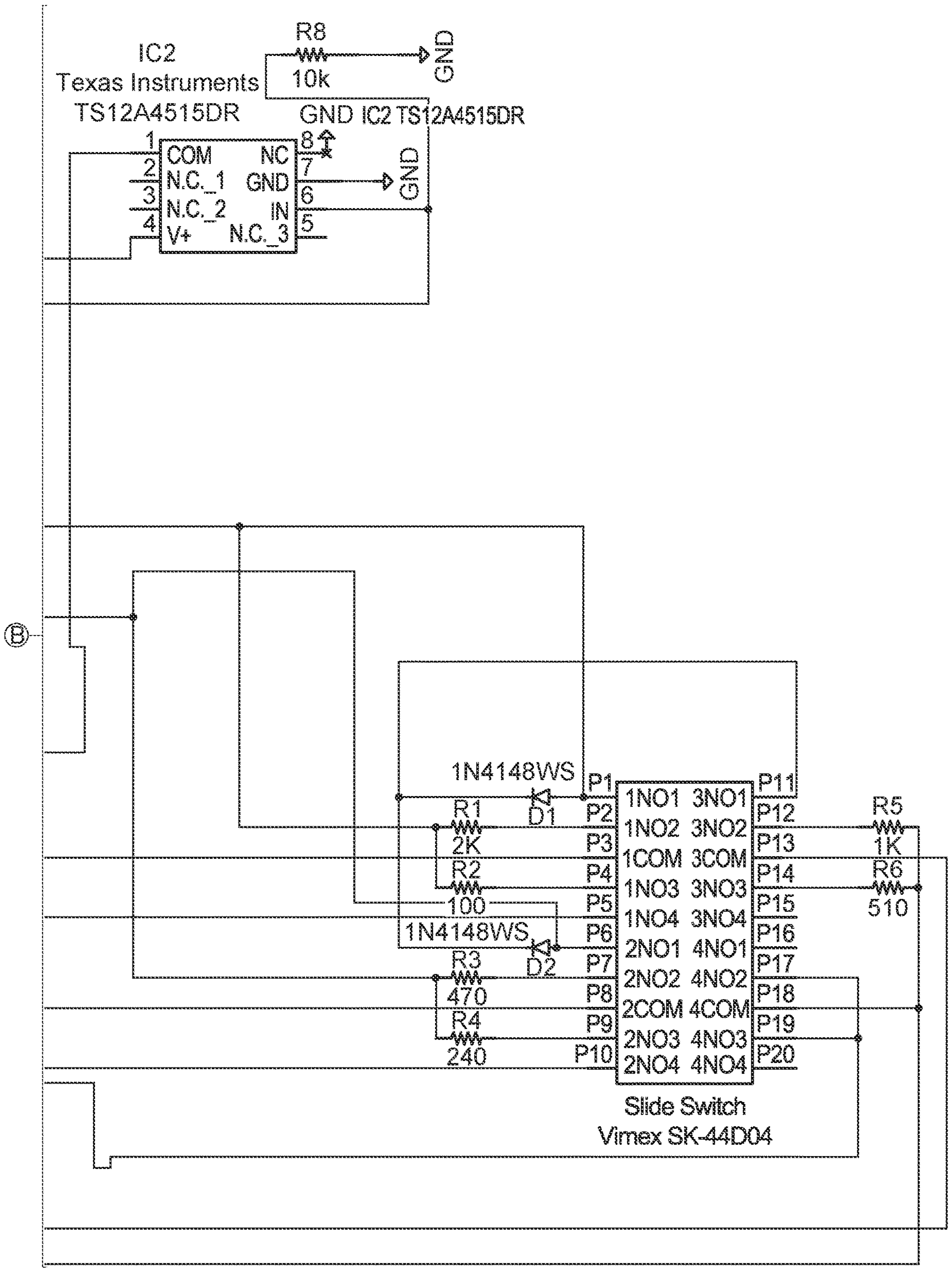
FIG. 5 (Continued...)

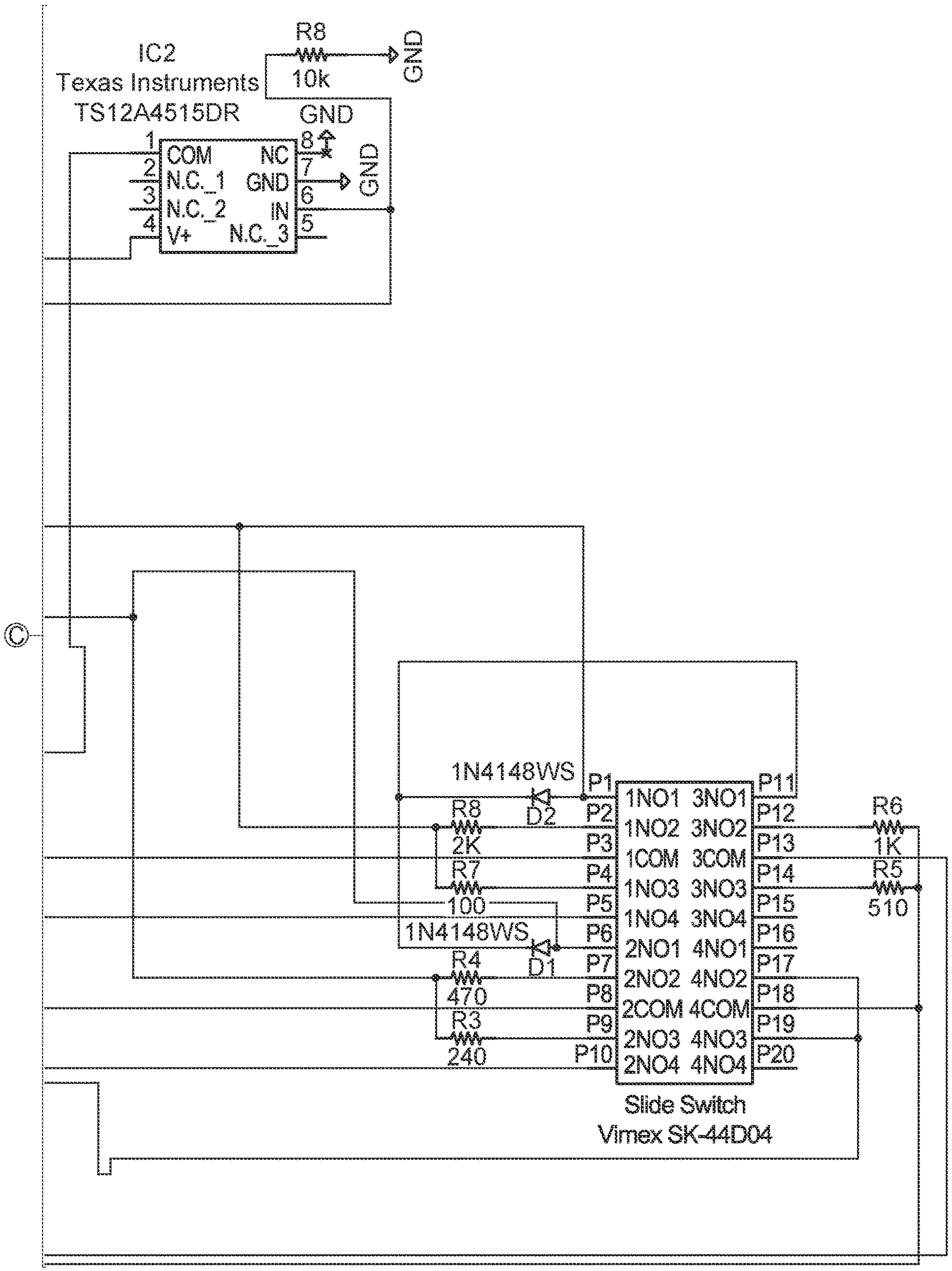
FIG. 7 (Continued...)

SYSTEM AND METHOD FOR UNIVERSAL AUXILIARY FOOTSWITCH

FIELD OF DISCLOSURE

This disclosure relates generally to the field of footswitches and more particularly a universal auxiliary footswitch with a customizable adapter bracket used for controlling musical instrument effects pedals. The footswitch has a number of binary switches that can be used to control digital guitar pedals. The footswitch has multiple, switchable circuits that make it compatible with diode based switching, Strymon, Meris, and Boss style digital guitar pedals.

BACKGROUND

In the music world, players use effects pedals to alter the sound of their instrument. These are devices with electronic circuits in them that have switches that the player can step on to activate. Historically, these pedals have mainly been analog circuits and they would do one simple effect. In modern times, digital effect pedals have become very prominent. These are basically little computers that run complex algorithms, rather than analog circuitry, to create effects. Since these little computers can do so much more than their analog counterparts, but the pedals themselves only have a couple of footswitches to press, it is oftentimes desirable to have external auxiliary units with more footswitches to help activate more options on the effects pedals. The auxiliary unit is plugged into the main effects pedal and then the user can have multiple extra footswitches to activate different parameters on the effects pedal.

For years musicians have had to make sure that, if they were using an aux switch with their effect pedal, they had the right one. Many aux switch manufacturers (Analog Endeavors, Saturn works, American Loopers, etc.) sell four different aux switches to accommodate the different aux circuits, but their pedals look exactly the same. This can be very confusing for the end user. For instance, they buy a Strymon effects pedal and buy an aux switch to use with the Strymon, only to find out that the aux switch they bought only works with Meris or Boss. This gets especially confusing on the used market where some people might not actually understand that there are different types of aux switches. Thus exists the need for a system that combines all four circuits into one enclosure so the user is never in doubt that what they have will work with whatever effects pedal they are using.

SUMMARY

The disclosure presented herein relates to a universal auxiliary footswitch system that combines circuits diode-based switching, such as Strymon, Meris, and Boss style digital guitar pedals, into one enclosure so the user is never in doubt that what they have will work with whatever effects pedal they are using. There are two slide switches on the OXU pedals that the player uses to change between diode-based switching style, Strymon style, Meris style and Boss style. The first slide switch on the back of the pedal simply changes between those four modes. There is a second slide switch on the bottom of the pedal that is only switched when using the Boss mode. This switch changes the entire circuit from a passive to a powered circuit. Since the Boss style needs normally closed switches, but all the other styles need normally open switches, the system uses a powered circuit that takes the normally open analog switches and runs them through a couple of ICs to make them act as normally closed switches.

The other aspect that makes the present invention unique is the mounting plate. We have made aux switches for just about 10 years. The mounting plate is custom designed with breakaway tabs that will allow the user to mount the auxiliary footswitch to the plate, then mount any of the effects pedals to the plate, break away the excess tabs, and have a fully custom mounting plate for whatever combination of effect pedal and auxiliary footswitch the user wants to use.

The preceding and following embodiments and descriptions are for illustrative purposes only and are not intended to limit the scope of this disclosure. Other aspects and advantages of this disclosure will become apparent from the following detailed description.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

In the Summary above and in this Detailed Description, and the claims below, and in the accompanying drawings, reference is made to particular features of the invention. It is to be understood that the disclosure of the invention in this specification does not include all possible combinations of such particular features, of other particular aspects and embodiments of the invention, and in the invention generally. It should also be appreciated that any language directed to a number may be replaced by another number such as one or more or a plurality.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
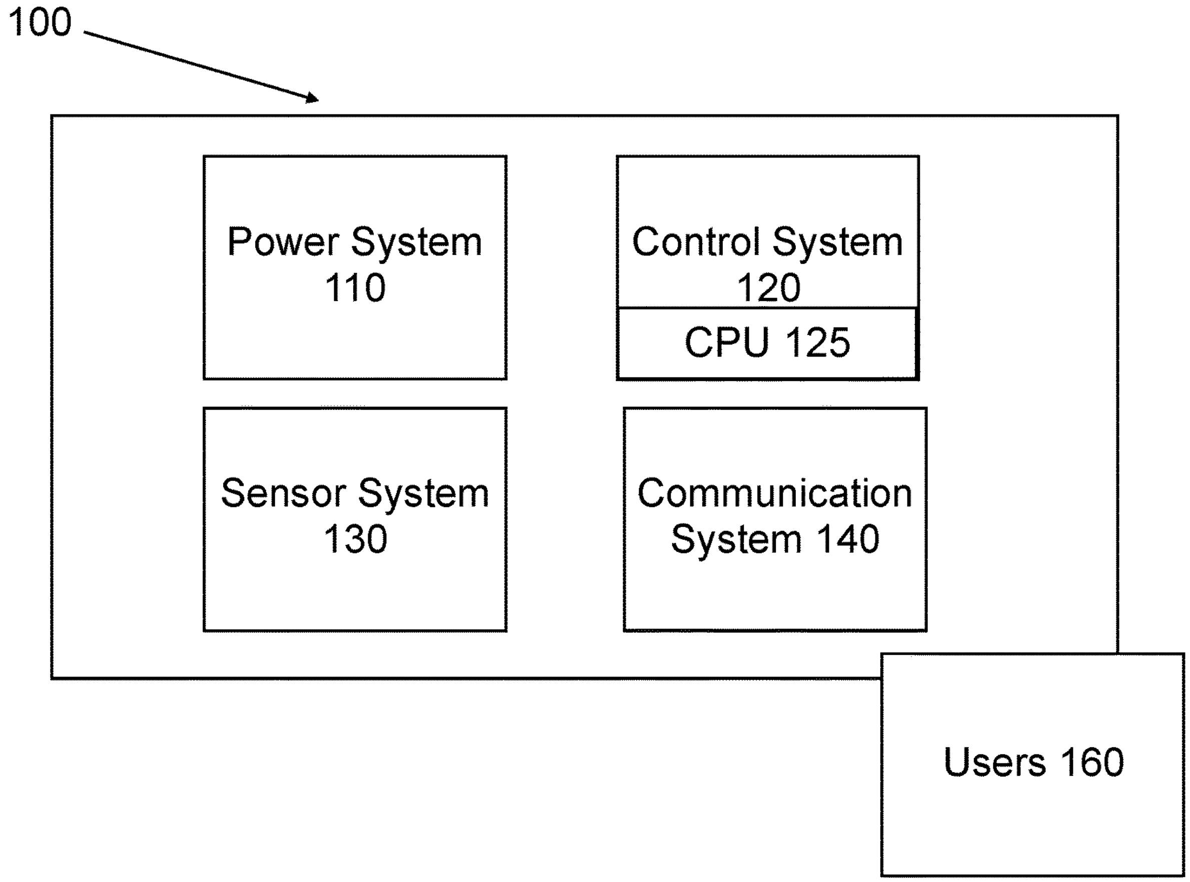
FIG. 1 shows a block diagram of the universal auxiliary footswitch system.

Referring now to FIG. 1, FIG. 1 is a block diagram of a universal auxiliary footswitch 100. Universal auxiliary footswitch 100 may be used to store audio effect algorithms, manipulate audio effect chains, adjust audio effect algorithms/parameters/presets; and record and playback loops while being able to switch modes to act as foot pedals with diode based switching such as, but not limited to, being modeled after the FS3X (abbreviated as FS3X), Strymon, Meris, and Boss foot pedals.

During use, a guitar or other instrument may be connected to a pedal connected to universal auxiliary footswitch 100 using a standard instrument cable or wireless signal. This cable carries the guitar's signal to the pedal and universal auxiliary footswitch 100. Another cable then connects universal auxiliary footswitch 100 to an amplifier. When the user plays the guitar, the sound signal travels through the cable into the pedal. Inside the pedal the signal is processed to add an effect, such as distortion, reverb, delay, chorus, or others, and those effects can be activated or further modified by auxiliary footswitch 100.

Universal auxiliary footswitch 100 may have one or more knobs, switches, or sliders that allow the user to further control the parameters of the pedal effect. When universal auxiliary footswitch 100 is active, it can assist with activation or modification of the signal processing.

Universal auxiliary footswitch 100 may include one or more components such as a power system 110, a control system 120, a sensor system 130, and a communication system 140. It should be appreciated that in some embodiments universal auxiliary footswitch 100 is a manually changeable circuit configuration, while in some embodiments universal auxiliary footswitch 100 may have a circuit configuration with a plurality of computing systems.

Power system 110 of universal auxiliary footswitch 100 provides the power to circuits and components of control system 120, sensor system 130, and communication system 140 during the process of controlling sound effects. Universal auxiliary footswitch 100 may be powered by methods known by those of ordinary skill in the art. In some embodiments, universal auxiliary footswitch 100 may plug into an electrical outlet using an electrical cord to supply power to control system 120, sensor system 130, and communication system 140.

Further, power system 110 may include a rechargeable battery pack whereby the rechargeable battery pack is of a charge, design, and capacity, to provide sufficient power to control system 120, sensor system 130, and communication system 140 while running universal auxiliary footswitch 100 for a set period of time needed to.

Control system 120 may operate to control the actuation of the other systems. Control system 120 may have a series of computing devices. Control system 120 may be in the form of, a circuit board, a memory or other non-transient storage medium in which computer-readable coded instructions are stored and one or more processors configured to execute the instructions stored in the memory. Control system 120 may have a wireless transmitter, a wireless receiver, and a related computer process executing on the processors.

Computing devices of control system 120, may be any type of computing device that typically operate under the control of one or more operating systems, which control scheduling of tasks and access to system resources. Computing devices may be a Raspberry Pi® or other computing devices such as but not limited to a phone, tablet, desktop computer, laptop computer, gaming system, networked router, networked switch, networked, bridge, or any computing device capable of executing instructions with sufficient processor power and memory capacity to perform operations of control system 120.

The one or more computing devices may be integrated into control system 120, while in other non-limiting embodiments, control system 120 may be a remotely located computing device or server configured to communicate with one or more other control systems. Control system 120 may also include an internet connection, network connection, and/or other wired or wireless means of communication (e.g., LAN, etc.) to interact with other components. The connection allows a user, such as user 160, to update, control, send/retrieve information, monitor or otherwise interact passively or actively with control system 120.

Control system 120 may include control circuitry and one or more microprocessors or controllers acting as a servo control mechanism capable of receiving input from sensor system 130 and communication system 140, analyzing the input from sensor system 130 and communication system 140, and generating an output signal. The microprocessors (not shown) may have on-board memory to control the power that is applied to power system 110, sensor system 130, and communication system 140 in response to input signals from the user 160 and from sensor system 130.

Control system 120 may include circuitry to provide an actuable interface such as user interface elements 220 for user 160 to interact with, including switches, buttons, and indicators and accompanying circuitry for an electronic control panel or mechanical control panel. Such an actuable interface may present options to user 160 to select from that would allow user 160 to control how various components. Control system 120 may be preprogrammed with any references values, by any combination hardwiring, software, firmware to implement various operational modes including but not limited to temperature, light, and humidity values.

Sensor system 130 may have one or more pressure plates 210 or additional pressure sensors or mechanical switch contained within universal auxiliary footswitch 100. Pressure plates 210 may have a mechanism for sensing pressure such as mechanical switches that are activated when enough force is applied to the plate, strain gauges that can measure the exact amount of force applied, piezoelectric sensors that generate a voltage when pressure is applied, which can then be measured to determine the force. When pressure is applied to pressure plate 210, the plate generates a signal and sensor system 130 sends the signal to control system 120. The generated signal is then used to trigger a response by control system such as recording or changing effects.

The microprocessors in control system 120 may also monitor the current state of circuitry within control system 120 to determine the specific mode of operation chosen by the user. Further, such microprocessors that may be part of control system 120 may receive signals from any of or all systems, including without limitation, sensor system 130, power system 110, and communication system 140. Such systems may be notified whether any of the components in the various systems need to be replaced or the status of the switch and what setting the switch is on.

Communication system 140 may allow user 160 to interact with control system 120 using a remote computing device even if user 160 is not proximate to control system 120. User 160 may access a user interface with a plurality of buttons or icons that are selectable by user 160 for communication system 140 to perform particular processes in response to the selections such as turning on a toggling to a specific mode or setting. In one or more non-limiting embodiments, communication system 140 may be innate, built into, or otherwise integrated into existing platforms or systems such as a website, a third party program, Apple™ operating systems (e.g., iOS), Android™, Snapchat™, Instagram™, Facebook™, or any other platform. In further embodiments, the guitar itself may have the communication system 140 whereby the user 160 may control various operations such as toggling to a specific mode or setting.

Control system 120 may have a circuit board which may include a CPU 125 and a set of digital input/output (I/O) pins and analog input pins to connect to one or more pressure plates 210, user interface elements 220, first slide switch 230, and second slide switch 240. Circuit board 122 may be powered through various sources, including USB connections, external power supplies, or batteries, depending on the specific board model. CPU 125 may include a programming interface whereby a user may write code, upload it to CPU 125 via a USB connection, and execute the code on CPU 125. In further embodiments, circuit board 122 may be wireless having an antenna and a radio frequency module enables the circuit board to communicate over radio frequencies for sending and receiving signals wirelessly.

CPU 125 may include a clock crystal or oscillator to provide precise timing for CPU 125. CPU 125 may include an onboard reset button that allows the user to restart circuit board 122 and reload new code. Circuit board 122 may include headers and connectors for easy attachment of hardware components, as well as shields which may stacked on top of circuit board 122.

As discussed, universal auxiliary footswitch 100 may have four modes corresponding to FS3X, Strymon, Meris, and Boss foot pedals, whereby first slide switch 230 on the back of the pedal simply changes between the four modes. Second slide switch 240 may be positioned on the bottom of the pedal and is only switched when using the Boss mode. Second slide switch 240 changes the entire circuit from a passive to a powered circuit.

The Digitech FS3X is a 3 button aux switch which has been copied by countless aux switch manufacturers over the years. It uses normally open, momentary footswitches with 2 diodes and an input jack to work. FS3X is typically associated with Digitech products and often refers to a footswitch designed to expand the control of certain pedals. It's not a standalone effect pedal but an accessory that allows for additional control over a compatible pedal's features. For example, it might be used to change presets or toggle through settings without needing to bend down and manually adjust the pedal. The FS3X style aux switch can be used with many brands of effects pedals, such as Digitech, Eventide, Line6, Source Audio, etc.

Strymon pedals are standalone effects units known for their high-quality sound and wide range of features. They are highly regarded in the industry for their digital processing capabilities. Strymon offers various types of effects, including reverb, delay, modulation, and more. Strymon came to prominence and they opted to have their effects pedals need a completely different style aux switch to work. Their aux circuit has three normally open footswitches, but instead of using two diodes to work, they decided to put three different resistors in line with the switches to create different voltages that the effects pedal then understands as different functions. The Strymon style aux switch can only be used with Strymon effects pedals.

Meris pedals are often praised for their unique and innovative sound designs. They tend to offer more experimental and cutting-edge effects, which can be particularly appealing to musicians looking for unique and ambient soundscape. Meris did a similar thing as Strymon when they released their effects pedals. Their aux circuit can be made to do up to 4 separate normally open switches, using different resistor values than what the Strymon pedal uses. The Meris aux switches can only be used with Meris effects pedals.

Boss is known for producing pedals that have become industry standards, recognized for their durability and reliability. They are widely used by musicians around the world, from beginners to professionals. Boss offers a wide range of effects, from classic sounds like overdrive, delay, and chorus to more modern and experimental effects. However, they tend to stick to more traditional and classic effect types. The Boss FS series has many different configurations of aux switches but the basic circuit is similar to the FS3X but with two key differences; 1: Boss effects pedals can only use two extra footswitches with their pedals, not three and 2: The footswitches must be normally CLOSED unlike the normally open footswitches in the FS3X. The Boss style aux switches only work with Boss effects pedals., etc. The Boss style aux switches only work with Boss effects pedals.

Figure 2:
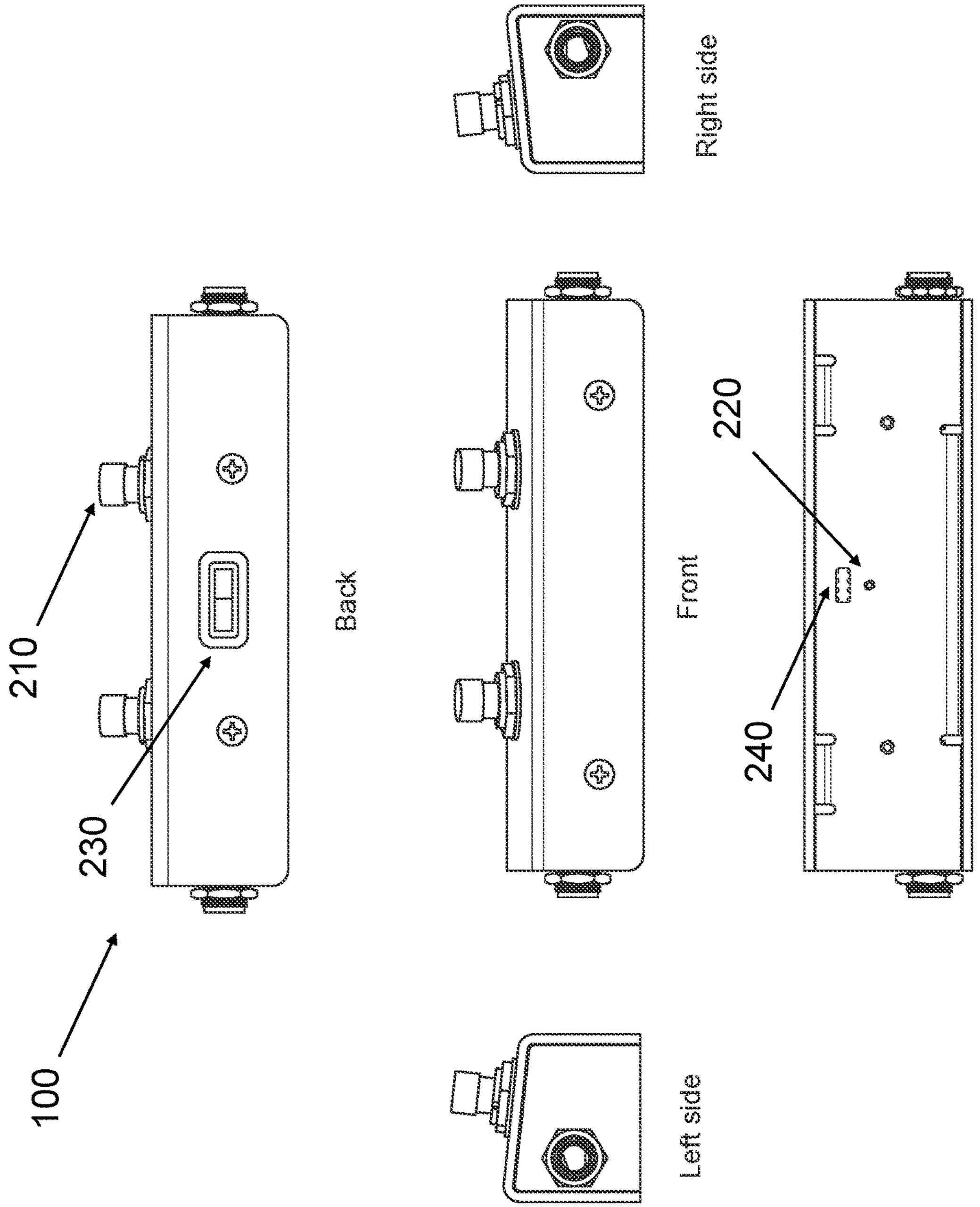
FIG. 2 shows an illustration of a first embodiment of the universal auxiliary footswitch.
Figure 3:
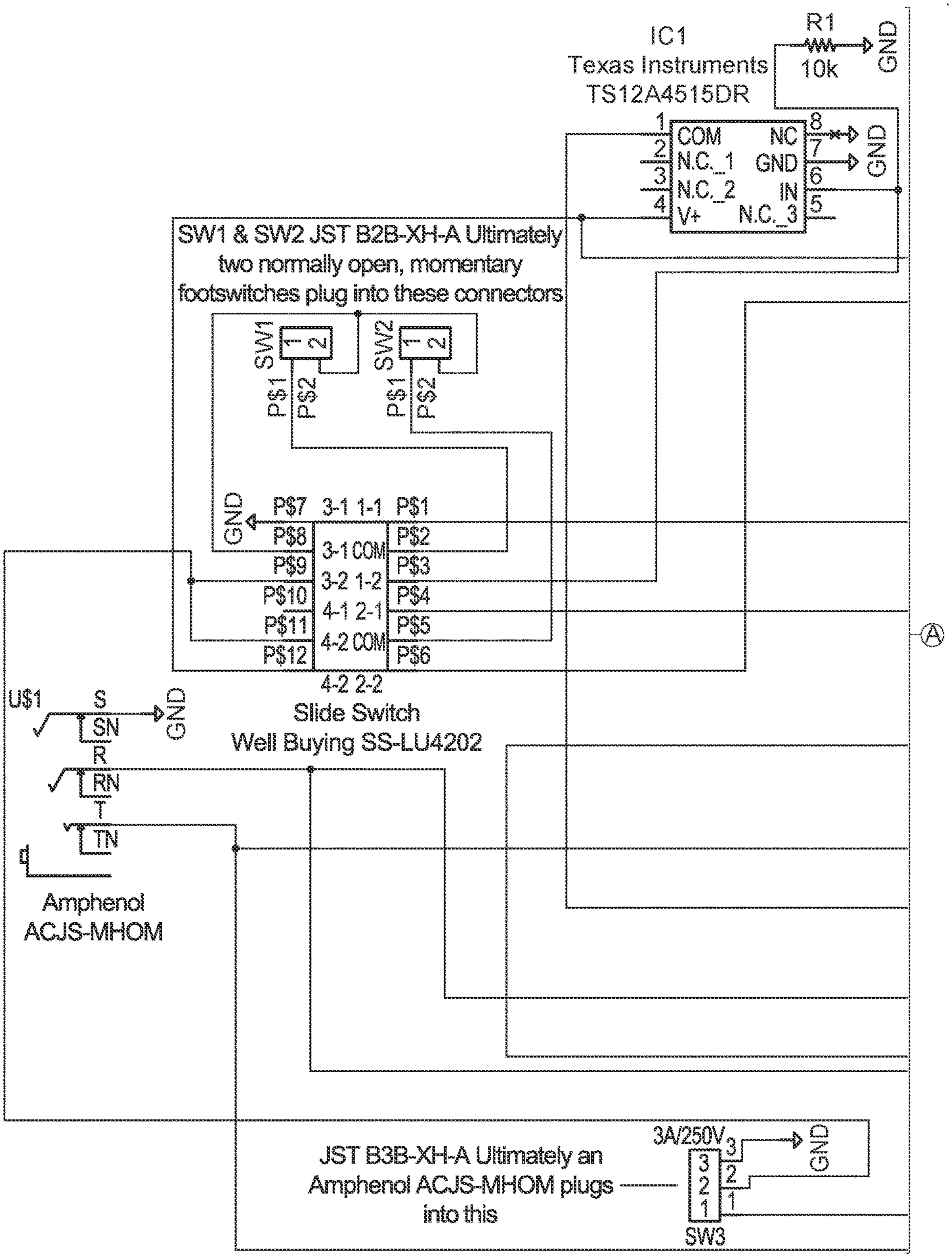
FIG. 3 shows the circuit system of the first embodiment.

FIG. 2 illustrates a first embodiment of universal auxiliary footswitch 100. Universal auxiliary footswitch 100 may include a TRS input from a secondary auxiliary footswitch or power input for Boss style switching. Universal auxiliary footswitch 100 may include a TRS output to a main effects pedal. Universal auxiliary footswitch 100 may include a four way selector switch for FS3X style, Strymon style, Meris style, and Boss style switching. Universal auxiliary footswitch 100 may include a slide switch to change from passive to powered for Boss pedals FIG. 3, illustrates a schematic diagram of one embodiment showing the circuitry of Universal auxiliary footswitch 100. The first embodiment of the circuitry may include a first and second analog switch. The analog switches may be a Texas Instruments TS12A4515 which is a single-pole, single-throw (SPST) analog switch, which operates with a single supply voltage ranging from 2 V to 12 V. The digital inputs of this switch have logic thresholds ranging from 0.8 V to 2.4 V, ensuring compatibility with TTL/CMOS logic when using a 5-V supply.

The first embodiment of the circuitry may include a first and second analog connector. The connectors may be a JST B2B-XH-A connector. This connector is a 2-position, through-hole type.

The first embodiment of the circuitry may include a slide switch. The slide switch may be a Well Buying SS-LUS4202 designed for a maximum current of 0.3 A and a maximum voltage of 6 VDC. Ultimately two normally open, momentary footswitches plug into these connectors. The slide switch allows universal auxiliary footswitch 100 to change from passive to powered circuit for Boss style switching.

The first embodiment of the circuitry may include a jack connector. The jack connector may be an Amphenol ACJS-MHOM which a 6.35 mm (¼") stereo (3 conductor, TRS) female headphone jack connector. It is designed for press-fit and solder connections.

The first embodiment of the circuitry may include a third connector. The connectors may be a JST B3B-XH-A connector. This connector is a 3-position, through-hole type. Ultimately an Amphenol ACJS-MHOM plugs into this.

The first embodiment of the circuitry may include a second slide switch. The slide switch may be a Vimex SK-44D04 slide switch whereby each pin in the slide switch is part of the switch's internal circuitry, allowing it to change states (on/off) based on the position of the sliding actuator. This allows universal auxiliary footswitch 100 to operate as a four way selector switch for FS3X style, Strymon style, Meris style and Boss style switching. The switch has a slide design and a central mechanism that can be rotated or slid into four distinct positions. Each position corresponds to a different circuit connection. The four positions of the selector switch are designed to route the electrical signal in different ways, corresponding to the four types of pedals.

Figure 4:
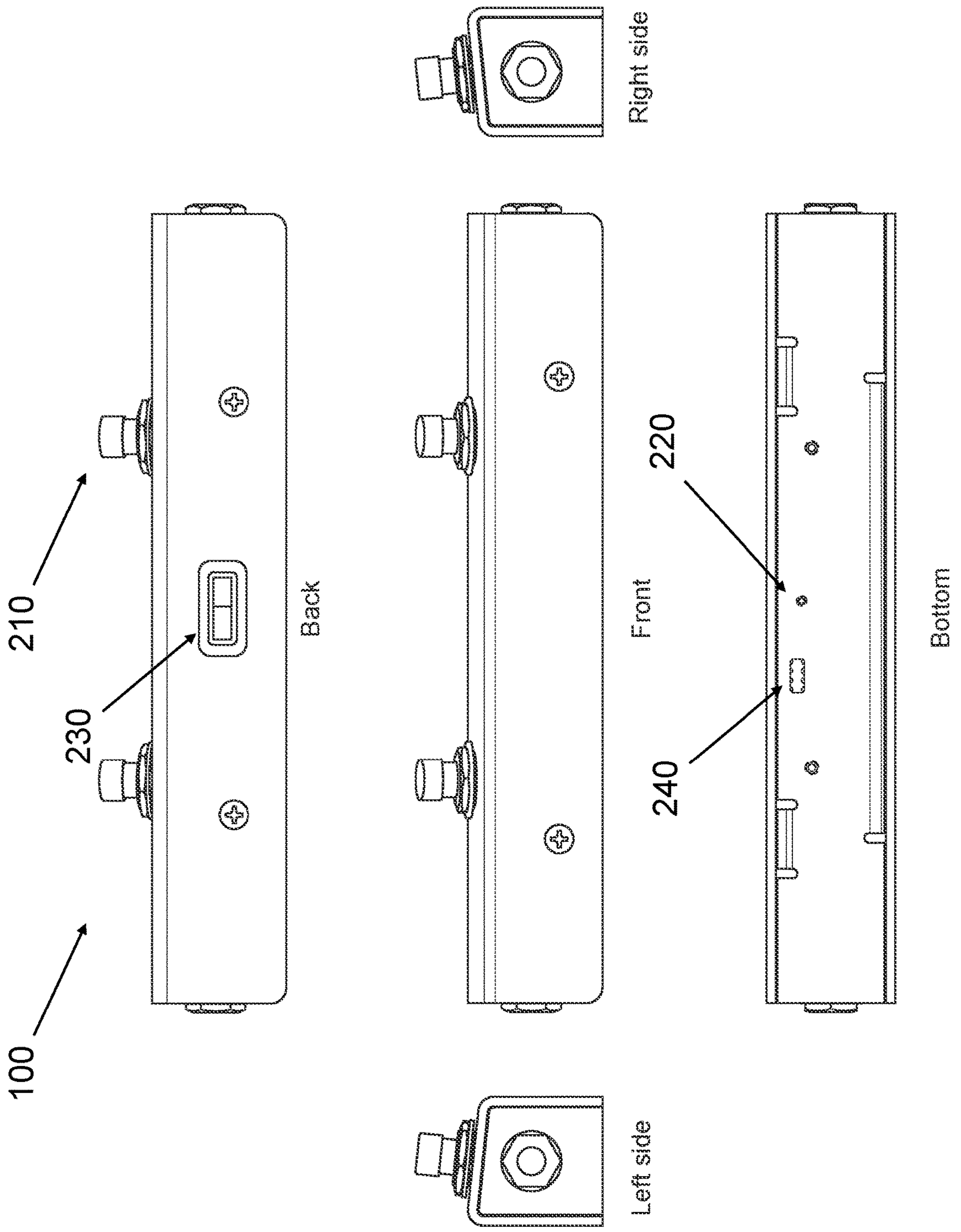
FIG. 4 shows an illustration of a second embodiment of the universal auxiliary footswitch.
Figure 5:
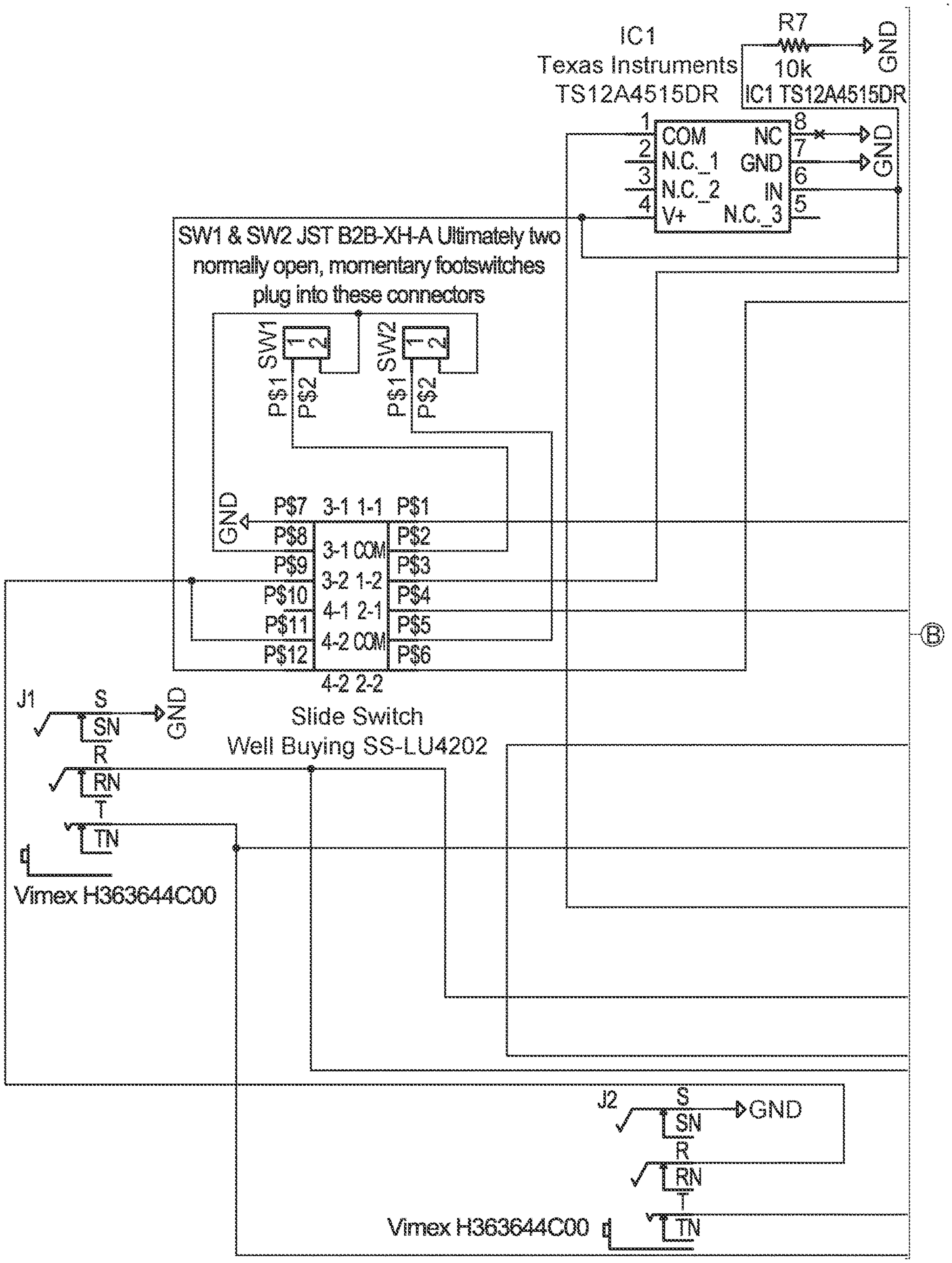
FIG. 5 shows the circuit system of the second embodiment.

FIG. 4 illustrates a second embodiment of universal auxiliary footswitch 100. Universal auxiliary footswitch 100 may include a TRS input from a secondary auxiliary footswitch or power input for Boss style switching. Universal auxiliary footswitch 100 may include a TRS output to a main effects pedal. Universal auxiliary footswitch 100 may include a four way selector switch for FS3X style, Strymon style, Meris style, and Boss style switching. Universal auxiliary footwitch may include a slide switch to change from passive to powered for Boss pedals FIG. 5, illustrates a schematic diagram of a second embodiment showing the circuitry of universal auxiliary footswitch 100. The second embodiment may include a first and second analog switch. The analog switches may be a Texas Instruments TS12A4515. The second embodiment of the circuitry may include a first and second analog connector. The connectors may be a JST B2B-XH-A connector. Ultimately two normally open, momentary footswitches plug into these connectors. The second embodiment of the circuitry may include a first slide switch. The first slide switch may be a Well Buying SS-LUS4202. The second embodiment of the circuitry may include a first and second phone jack which may be a Vimex H363644C00 phone jack. The second embodiment of the circuitry may include a second slide switch. The fourth switch may be a Vimex SK-44D04 slide switch.

Figure 6:
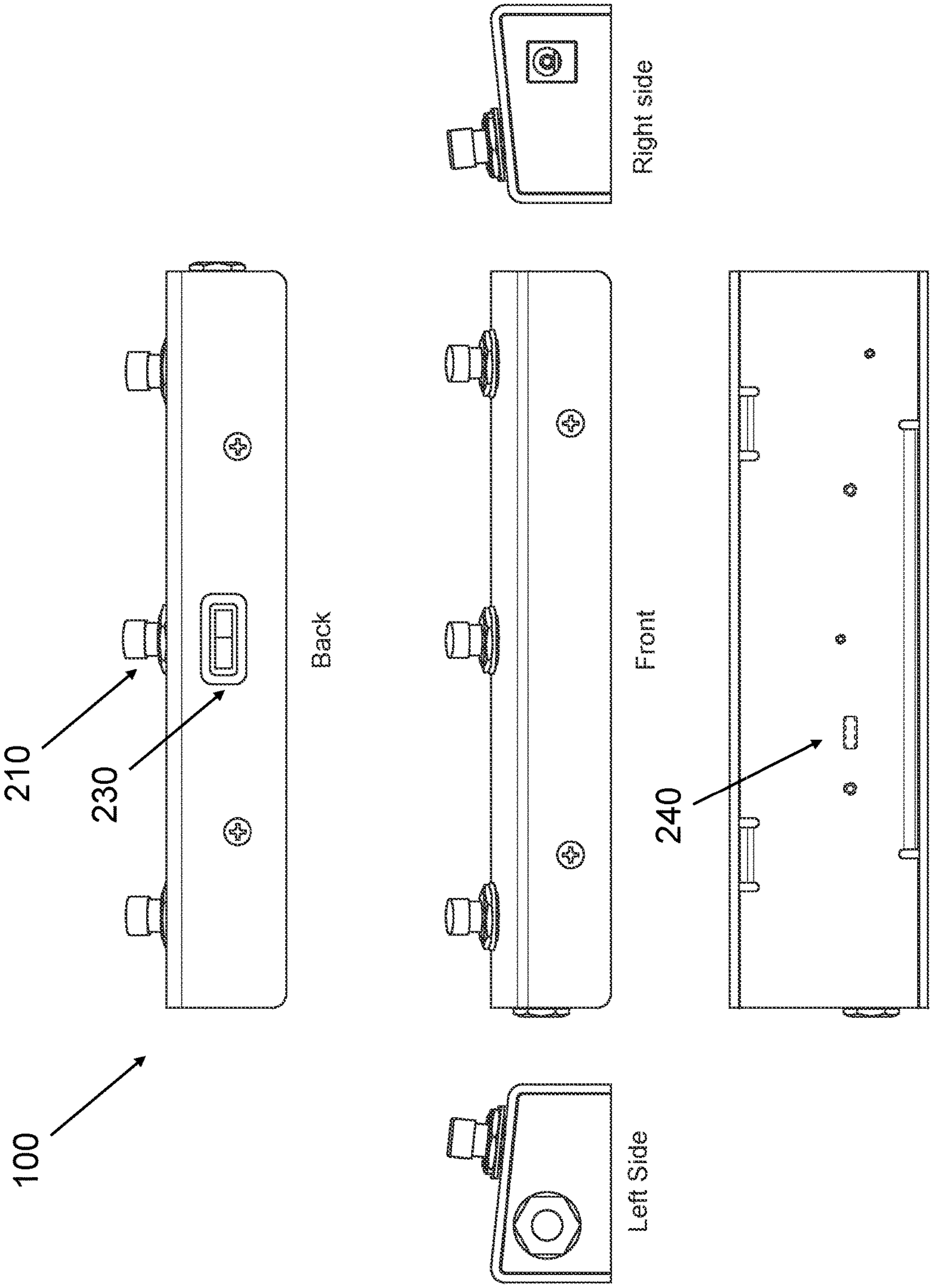
FIG. 6 shows an illustration of a third embodiment of the universal auxiliary footswitch.
Figure 7:
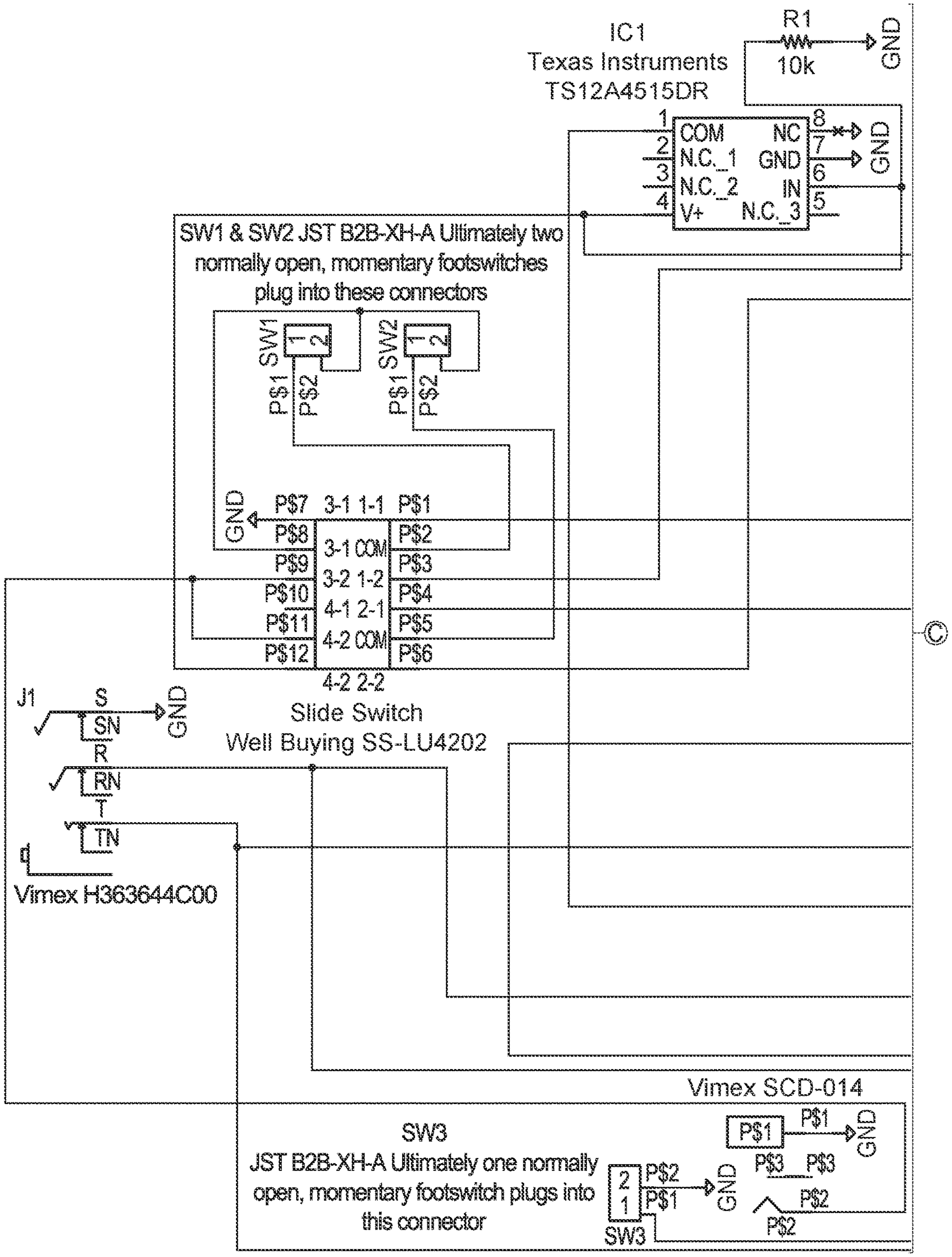
FIG. 7 shows the circuit system of the third embodiment.

FIG. 6 illustrates a third embodiment of universal auxiliary footswitch 100. Universal auxiliary footswitch 100 may include a 9v DC power jack. Universal Auxiliary footswitch 100 may include a TRS output to a main effects pedal. Universal auxiliary footswitch may include a 4 way selector switch for FS3X style, Strymon style, Meris style, and Boss style switching. Universal auxiliary footswitch may include a slide switch to change from passive to powered for Boss pedals FIG. 7, illustrates a schematic diagram of a third embodiment showing the circuitry of universal auxiliary footswitch 100. The third embodiment may include a first and second analog switch. The analog switches may be a Texas Instruments TS12A4515. The third embodiment of the circuitry may include a first and second analog connector. The connectors may be a JST B2B-XH-A connector. The third embodiment of the circuitry may include a first slide switch. The first slide switch may be a Well Buying SS-LUS4202. The third embodiment of the circuitry may include a phone jack. The phone jack may be a Vimex H363644C00 phone jack. The third embodiment of the circuitry may include a through hole power jack which may be a Vimex scd-014. The third embodiment of the circuitry may include a second slide switch. The second slide switch may be a Vimex SK-44D04 slide switch. The third embodiment of the circuitry may include a third connector. The connectors may be a JST B2B-XH-A connector which ultimately one normally open, momentary footswitch plugs into this connector.

It should be noted that though the actual products used are listed in FIG. 3-7. This is non-limiting and any other substitute product that does not stray away from the present invention may instead replace one or more of the components.

Figure 8:
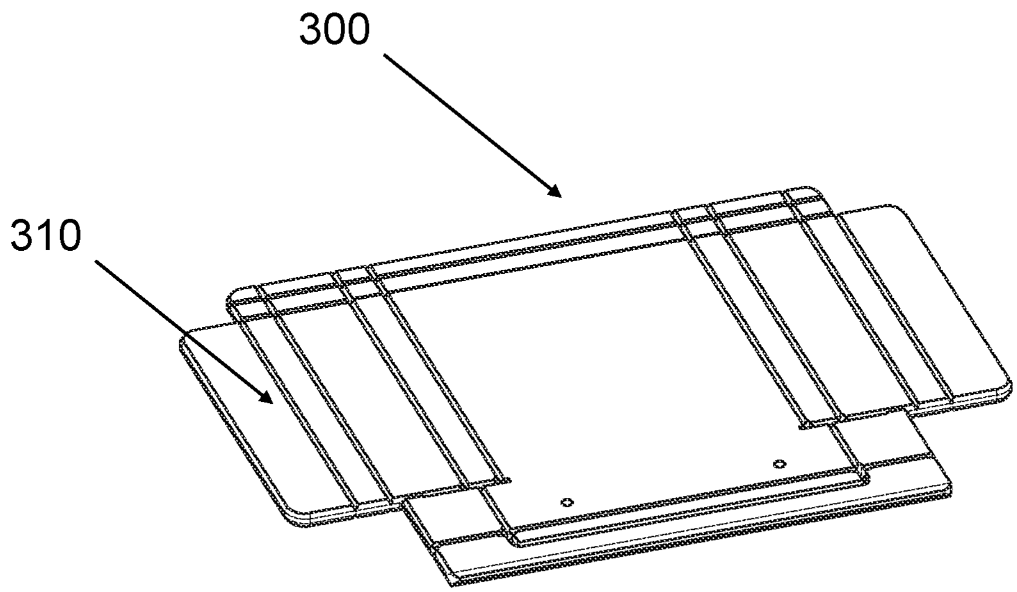
FIG. 8 shows an illustration of the mounting plate.
Figure 9:
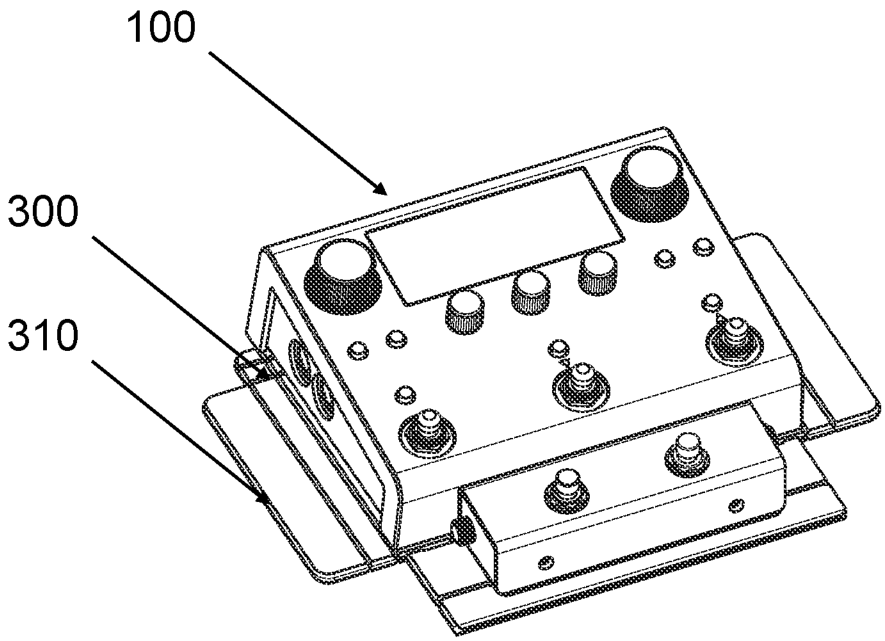
FIG. 9 shows an illustration of the mounting plate with the effects pedal and universal auxiliary footswitch.

Universal auxiliary footswitch 100 may be positioned on a specially designed mounting plate 300 as illustrated in FIG. 8. Mounting plate 300 may have breakaway tabs that will allow the user to mount universal auxiliary footswitch 100 to mounting plate 300, then mount any of the effects pedals to mounting plate 300, break away the excess tabs, and have a fully custom mounting plate for whatever combination of effect pedal and auxiliary footswitch the user wants to use.

Mounting plate 300 may have a flat surface onto which user 160 may attach their guitar pedals. Pedals may be attached to Mounting plate 300 using mounting holes, Velcro, dual-lock strips, or brackets. Mounting plate 300 may have channels or hooks to neatly route and secure patch cables and power cords, reducing clutter and the risk of cables being accidentally unplugged. Mounting plate 300 may have one or more breakaway tabs 310, also known as mouse bites or V-scores, which are pre-designed weak points in a material that allow for controlled breaking or separation. The V-shaped cuts may be made on the top and bottom surfaces of the panel. They do not fully penetrate the panel, leaving a thin layer of material that can be easily broken apart. When it is time to reduce the area of mounting plate 300, mounting plate 300, may bent at the V-score or along the line of mouse bites. The material breaks cleanly along these predetermined lines to provide a customized mounting plate 300.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A universal auxiliary footswitch compatible with a diode based switching selection, a Strymon selection, a Meris selection, and a Boss style selection, wherein when on a specific selection, the universal auxiliary footswitch is compatible with that type of guitar pedal, wherein the universal auxiliary footswitch has a selector switch configured to select between four distinct circuit configurations corresponding to: a diode-based switching circuit, a first resistor-based switching circuit, a second resistor-based switching circuit with different resistance values from the first resistor-based switching circuit, and a normally-closed switching circuit.

2. The universal auxiliary footswitch of claim 1, further comprising a TRS input from a secondary auxiliary footswitch or power input for the Boss style selection.

3. The universal auxiliary footswitch of claim 2, further comprising a TRS output to a main effects pedal.

4. The universal auxiliary footswitch of claim 1, further comprising a 9 volt power jack.

5. The universal auxiliary footswitch of claim 4, further comprising a TRS output to a main effects pedal.

6. The universal auxiliary footswitch of claim 1, further comprising one or more pressure plate switches activatable by pressing of a foot.

7. A universal auxiliary footswitch compatible with a plurality of different style guitar pedals combining circuitry for the plurality of different style guitar pedals into one housing wherein when on a specific selection, the circuitry is altered to provide compatibility for a main effects pedal corresponding to the specific selection, the universal auxiliary footswitch having a four way selector switch to route an electronic signal, the universal auxiliary footswitch having a two way selector switch to toggle circuitry between a passive circuit for a first selection and a second selection and a third selection and a powered circuit for enabling a fourth selection, wherein the universal auxiliary footswitch uses analog switches that open and runs the analog switches through integrated circuits such that the analog switches act as closed switches.

8. The universal auxiliary footswitch of claim 7, further comprising a TRS input from a secondary auxiliary footswitch or power input for Boss style switching.

9. The universal auxiliary footswitch of claim 8, further comprising a TRS output to the main effects pedal.

10. The universal auxiliary footswitch of claim 7, further comprising a 9 volt power jack.

11. The universal auxiliary footswitch of claim 10, further comprising a TRS output to the main effects pedal.

* * * * *